(12) United States Patent
Petersen et al.

(10) Patent No.: US 10,683,967 B2
(45) Date of Patent: Jun. 16, 2020

(54) COOLING OF A SUPPLY PIPE IN A HYDROGEN REFUELING SYSTEM

(71) Applicant: Nel Hydrogen A/S, Herning (DK)

(72) Inventors: Leif Kappel Petersen, Lem St (DK); Jesper Nissen Boisen, Herning (DK)

(73) Assignee: NEL HYDROGEN A/S, Herning (DK)

( * ) Notice: Subject to any disclaimer, the term of this patent is extended or adjusted under 35 U.S.C. 154(b) by 0 days.

(21) Appl. No.: 15/446,657

(22) Filed: Mar. 1, 2017

(65) Prior Publication Data
US 2017/0254479 A1 Sep. 7, 2017

(30) Foreign Application Priority Data

Mar. 2, 2016 (DK) .................. 2016 00136

(51) Int. Cl.
*F17C 5/06* (2006.01)
*F17C 5/00* (2006.01)

(52) U.S. Cl.
CPC .................. *F17C 5/06* (2013.01); *F17C 5/00* (2013.01); *F17C 2205/0332* (2013.01); *F17C 2205/0355* (2013.01); *F17C 2205/0364* (2013.01); *F17C 2205/0376* (2013.01); *F17C 2221/012* (2013.01); *F17C 2221/013* (2013.01); *F17C 2227/0341* (2013.01); *F17C 2227/0353* (2013.01); *F17C 2227/0355* (2013.01); *F17C 2250/03* (2013.01); *F17C 2250/0439* (2013.01); *F17C 2250/0631* (2013.01); *F17C 2265/065* (2013.01); *F17C 2270/0139* (2013.01);

(Continued)

(58) Field of Classification Search
CPC ........ F17C 2221/012; F17C 2250/0439; F17C 2227/0341; F17C 5/06; F17C 2227/0353; F17C 2227/0355; F17C 2265/065
See application file for complete search history.

(56) References Cited

U.S. PATENT DOCUMENTS

| 1,878,042 A | * | 9/1932 | Wagner .................. F25D 3/125 |
| | | | 33/23.03 |
| 6,672,340 B2 | * | 1/2004 | Mutter ..................... F17C 5/06 |
| | | | 141/21 |

(Continued)

FOREIGN PATENT DOCUMENTS

| DE | 10 2009 037 108 A1 | 2/2011 |
| EP | 2 175 187 | 4/2010 |

(Continued)

*Primary Examiner* — Andrew D Stclair
(74) *Attorney, Agent, or Firm* — Cantor Colburn LLP (57) ABSTRACT

A hydrogen refueling system including a hydrogen center enclosure fluidly connected to a dispenser by a supply pipe, a first portion of the supply pipe disposed within the hydrogen center enclosure and a second portion of the supply pipe extending between the hydrogen center enclosure and the dispenser, a cooling system having a first cooling circuit for cooling the supply pipe and a second cooling circuit for cooling the second portion of the supply pipe, and a controller, where the second cooling circuit has a return path fluidly connected to a forward path, where the second cooling circuit is thermally connected to the second portion of the supply pipe, and the controller initiates cooling of the supply line by the forward path or return path of the second cooling circuit when the temperature of the supply line is higher than a threshold value.

20 Claims, 6 Drawing Sheets

(52) U.S. Cl.
CPC ..... *F17C 2270/0581* (2013.01); *Y02E 60/321* (2013.01); *Y02P 90/45* (2015.11)

(56) References Cited

U.S. PATENT DOCUMENTS

| | | | | |
|---|---|---|---|---|
| 7,938,150 | B2* | 5/2011 | Handa | F17C 5/007 141/285 |
| 8,757,223 | B2* | 6/2014 | Uemura | F17C 5/06 141/197 |
| 2003/0146106 | A1* | 8/2003 | Mitlitsky | C25B 15/08 205/637 |
| 2008/0302504 | A1* | 12/2008 | Handa | F17C 5/007 165/47 |
| 2009/0110990 | A1* | 4/2009 | Izutani | C01B 3/00 429/410 |
| 2010/0307636 | A1* | 12/2010 | Uemura | F17C 5/06 141/4 |
| 2011/0005735 | A1 | 1/2011 | Adler et al. | |
| 2012/0000574 | A1* | 1/2012 | Nishiumi | F17C 5/06 141/94 |
| 2012/0216915 | A1* | 8/2012 | Takata | F17C 5/06 141/82 |
| 2012/0227864 | A1* | 9/2012 | Mori | F17C 5/06 141/95 |
| 2014/0102587 | A1* | 4/2014 | Nagura | H01M 8/04208 141/69 |
| 2014/0224379 | A1* | 8/2014 | Adler | F17C 5/06 141/4 |
| 2015/0267865 | A1* | 9/2015 | Adler | F17C 7/00 141/11 |
| 2016/0146400 | A1* | 5/2016 | Allidieres | F17C 5/007 141/4 |
| 2017/0328519 | A1* | 11/2017 | Okuno | F17C 5/06 |

FOREIGN PATENT DOCUMENTS

| | | |
|---|---|---|
| EP | 2 487 401 A1 | 8/2012 |
| JP | 2009-510352 | 3/2009 |
| JP | 2011-231799 | 11/2011 |
| JP | 2013-148197 | 8/2013 |
| JP | 2014 238159 A | 12/2014 |
| JP | 2015-127564 | 7/2015 |
| WO | 2009 047631 A2 | 4/2009 |
| WO | 2011 018174 A1 | 2/2011 |
| WO | 2014 135258 A1 | 9/2014 |

\* cited by examiner

COOLING OF A SUPPLY PIPE IN A HYDROGEN REFUELING SYSTEM

CROSS REFERENCES TO RELATED APPLICATIONS

This application claims the benefit of Danish patent application No. PA 2016 00136 filed on 2 Mar. 2016, incorporated herein by reference.

FIELD OF THE INVENTION

The invention relates to hydrogen refueling systems, particularly to methods for cooling a supply pipe of such refueling systems.

BACKGROUND OF THE INVENTION

The temperature of the hydrogen supplied to a vehicle should preferably be within a range of minus 33° C. and minus 40° C. within a period of 30 seconds from start of the refueling. If e.g. during the night no refueling has been made to the hydrogen refueling station the hydrogen feed line may be heated to the ambient temperature which easily could be plus 5-10° C. Accordingly, when the first refueling is initiated after such period of no refueling, the cooling system has to cool the hydrogen to the desired temperature within the desired time from start of the refueling. Accordingly, due to thermal inertia of components of the refueling system—e.g. the hydrogen feed line—it may be difficult to satisfy the temperature requirement within a given period from start of refueling.

WO2014/135258 discloses a solution for cooling a tank feed line by supplying cooled hydrogen through the tank feed line. The cooled hydrogen is forwarded from a hydrogen storage system via the tank feed line to a connection point at the tank feed line. According to the solution, the hydrogen is returned from the connection point to the supply tank system in order to cool the tank feed line. Returning the hydrogen to the storage system may be disadvantageous due to the need for using lengths of pipes for returning the hydrogen back to the storage system. Furthermore, including the storage system in the return path for the hydrogen may be disadvantageous due to possible additional cooling requirements.

WO2011018174 discloses a method for filling a storage container from a dispenser with compressed hydrogen, the hydrogen being compressed by a compressor located in a compressor station. WO2011018174 discloses to at least partly cool the hydrogen in the filling line between the compressor station and the dispenser by using the filling line as part of a heat exchanger of the cooling system. Making the capacity of the cooling system dependent on the length between the compressor station and the dispenser are limiting the freedom of design of the hydrogen refueling station, which is not desirable.

SUMMARY OF THE INVENTION

An aspect of the invention relates a hydrogen refueling system for filing a vessel of a vehicle with hydrogen, the hydrogen refueling system comprising: a hydrogen center enclosure fluidly connected to a dispenser by a supply pipe, a cooling system connected to a cooling circuit, and a controller, wherein at least part of the cooling circuit is thermally connected to the supply pipe, and wherein the controller is configured for controlling the cooling system and thereby the temperature of the supply pipe so that the temperature of the supply pipe is between minus 10° C. and minus 50° C.

The temperature of the supply pipe may vary outside normal operation of the hydrogen refueling station, however in steady state i.e. between or during refuelings the specified temperature range is maintained. Outside steady state e.g. during mal function or start up of the hydrogen refueling system the temperature of the supply pipe is not important at least with respect to complying with standard specified temperature of delivered hydrogen.

According to an embodiment of the invention the controller is configured for controlling the cooling system down to a temperature of minus 45° C. Being able to control the temperature of the cooling system and thereby the supply pipe in the range of e.g. minus 10° C. and minus 50° C. and the temperature of the hydrogen down to a temperature of e.g. minus 45° C. is advantage in that the net heat transfer between the cooling circuit (or refrigerant hereof) and the supply pipe (or the hydrogen hereof) can be reduced and preferably close to be eliminated.

The net heat transfer iscan measured at the point of thermal connection between the supply pipe and the cooling circuit closest to the dispenser. Preferably, the net heat transfer is determined by measuring the temperature of the hydrogen and the supply pipe cooling media of the cooling circuit at the dispenser.

To facilitate such low delta temperature difference while having a maximum temperature of the hydrogen at the dispenser requires regularly or continuous circulation of the supply pipe cooling media.

It is preferred that the net heat transfer is zero between two measuring points of the supply pipe between which the distance is as long as possible, preferably this distance is the distance which is below ground level.

It is preferred that the cooling system is locate within or next to the hydrogen center enclosure, however this is not mandatory to the present invention.

The hydrogen temperature measured at the dispenser can be measured by existing temperature sensors.

According to an embodiment of the invention, the cooling system is arranged for cooling the hydrogen delivered from a hydrogen supply to the vessel via the dispenser and the supply pipe, the supply pipe is arranged for guiding the hydrogen from the center enclosure to the dispenser, wherein the cooling circuit is formed at least partly by a return path fluidly connected with a forward path thereby facilitating a circulation of the supply pipe cooling media, the forward path is arranged for guiding the supply pipe cooling media from the cooling system towards the dispenser where the forward path extends at least a fraction of the distance between the hydrogen center and the dispenser, and the return path is arranged for guiding at least a fraction of the supply pipe cooling media back to the cooling system, where at least one of the forward and return paths are thermally connected with the cooling system, wherein the one of the forward path and/or return path facilitating the cooling of the supply pipe is thermally connected with the supply pipe over at least a fraction of the length of the supply pipe whereas the one of the forward path and return path which does not facilitate cooling of the supply pipe is thermally isolated from the supply pipe over at least a fraction of the length of the supply pipe.

According to an embodiment of the invention, the supply pipe cooling media is a refrigerant which when entering the forward path is in its liquid state and in the return path changing stated towards its gaseous state. As refrigerant, carbon dioxide is advantageous in that the temperature difference between carbon dioxide in the forward path and in the return path of the cooling circuit is small. However, any refrigerant can be used. This is due to the phase shift between the liquid state and the gaseous state, which is keeping the temperature of the refrigerant stable. This is leading to a reduced amount of carbon dioxide, which needs to be circulated in the cooling circuit to cool the supply pipe.

According to an embodiment of the invention, the forward path is thermally isolated from the supply pipe over at least a fraction of the length of the supply pipe and wherein the return path is thermally connected to the supply line over at least a fraction of the length of the supply pipe. Advantageous in that the change of state of the refrigerant to (or close to) its complete gaseous state (and thereby when the temperature of the refrigerant starts to increase) is then happening as close to the beginning of the supply pipe as possible. Thereby, is ensured as much cooling capacity of the refrigerant as possible as close to the dispenser as possible.

Advantageously, the forward and return paths may form part of a closed circuit so that the supply pipe cooling media can be circulated in the forward and return paths. The forward and return paths may be directly or indirectly connected so that the supply pipe cooling media is repeatedly circulated through these forward and return paths via the cooling system, e.g. through the cooling system or via the cooling system. Thus, the supply pipe cooling media may not need to be circulated via the hydrogen supply. Accordingly, the supply pipe cooling media may traverse a relatively short distance so that thermal heat loss, e.g. from the return path may be kept low. Furthermore, the relatively short distance of the circulation path may advantageously reduce the amount of pipes needed for the closed circuit.

According to an embodiment the controller is configured to control a temperature of the supply pipe dependent on the operational value. Advantageously, control of the temperature of the supply pipe may be used to ensure that the temperature of the supply pipe is maintained within a desired temperature range or close to a desired temperature set-point. Accordingly, by means of the controller the temperature of the supply pipe may be maintained at a desired temperature between refueling processes, where there may not be a flow of cooled hydrogen. For example, the operational value may be one of a measured temperature, a measured pressure, a time, a measured flow value or a temperature parameter.

According to an embodiment, the cooling system is additionally arranged to cool the supply pipe cooling media. The cooling of the supply pipe cooling media may be achieved by means of the forward and return paths being thermally connected with the cooling system. Advantageously, the cooling system is used both for cooling the hydrogen from the hydrogen supply and for cooling the supply pipe cooling media for the forward and return paths.

According to an embodiment, the cooling system is arranged to guide the supply pipe cooling media to the forward path. Thus, the forward path may be fluidly connected with cooling system.

According to an embodiment, the return path is fluidly connected with the forward path so that the return and forward paths form part of a closed circuit for circulating the supply pipe cooling media. Thus, the forward path and the return may constitute the closed circuit or form part of the closed circuit. Other parts of the closed circuit may include a part of the cooling system, connection pipes, pumps and valves. The fluidic connection between the return path and the forward path may be arranged so that supply pipe cooling media is continuously circulated, i.e. so that the flow velocity/mass flow through the closed circuit is substantially the same at a given point in time.

According to an embodiment the hydrogen refueling system comprises a pump for circulating the supply pipe cooling media in the closed circuit. The controller may be arranged for controlling the pump dependent on the operational value. Alternatively, instead of pumping the refrigerant in the closed circuit the pressure difference between the first and second tanks can be used circulate the refrigerant. Advantageously, the flow velocity of the supply pipe cooling media may be controlled in order to control the temperature of the supply pipe.

According to an embodiment, the forward path consists of at least a fraction of the length of the supply pipe. Advantageously, when the supply pipe is not used for refueling purposes, the supply pipe may be used as the forward path for the purpose of maintaining the temperature of the supply pipe within a desired range. This may be particularly advantageous in an embodiment where supply pipe cooling media is the hydrogen.

According to an embodiment, the supply pipe comprises a shut-off valve which is controllable to direct the hydrogen to the return path or to direct the hydrogen to a fueling hose. The shut-off valve may be controllable by the controller, so that when a refueling is completed, the shut-off valve is controlled direct the hydrogen to the return path in order to initial circulation of the supply pipe cooling media, e.g. the hydrogen, in the closed circuit, i.e. the closed cooling circuit.

According to an embodiment, the hydrogen refueling system comprises a further shut-off valve arranged to prohibit hydrogen in the return path to flow back to the hydrogen supply. Accordingly, by means of this further shut-off valve, a closed circuit—which includes the forward and return paths—which is fluidly disconnected from the hydrogen supply may be obtained.

According to an embodiment the hydrogen refueling system may be configured so that the forward and return paths are fluidly disconnected from the supply pipe. Advantageously, since the forward and return paths may be operated independently from the operation of the supply pipe, the supply pipe may be cooled both during refueling processes and in between refueling processes.

According to an embodiment the cooling system is arranged to be cooled by a cooling fluid circulated in an input cooling circuit in the cooling system. For example, the cooling fluid may be carbon dioxide.

According to an embodiment the forward and return paths may be arranged to be cooled by the cooling fluid circulated in the cooling system. Accordingly, the same cooling fluid may be used for obtaining cooling in the cooling system and the forward and return paths. Accordingly, the supply pipe cooling media in the forward and return paths may be the cooling fluid or a supply pipe cooling media which is not in fluidic communication with the cooling fluid.

It is noted that a distinction can be made between the cooling fluid and the supply pipe cooling media, so that the supply pipe cooling media refers to the cooling media circulated in the forward and return paths and the cooling fluid refers to the cooling fluid used for cooling the cooling system.

According to an embodiment, the forward and return paths are arranged so that the supply pipe cooling media in the forward and return paths can be cooled by thermal heat exchange with the cooling fluid. Accordingly, the supply pipe cooling media need not be in contact with the cooling fluid and vice versa.

According to an embodiment, the forward and return paths are fluidly connected with the cooling system to enable at least a fraction of the flow of the cooling fluid circulated in the cooling system to be circulated in the forward and return paths. Advantageously, according to this embodiment, the cooling fluid may be used both as refrigerant in the cooling system and for cooling the supply pipe.

According to an embodiment, the cooling fluid in the forward and return paths comprise cooling fluid in gas form and cooling fluid in liquid form. Advantageously, by having a given ratio of cooling fluid in gas and liquid forms the temperature of the forward path may be substantially constant along the forward path and, therefore, the temperature along the supply pipe may be substantially constant or the temperature variation along the supply pipe may be low.

According to an embodiment, the forward path is thermally connected with the supply pipe over at least a fraction of the length of the pipe. Thus, by means of the thermal connection the temperature of the supply pipe can be controlled via the forward path.

According to an embodiment the return path is thermally isolated from the supply pipe over at least a fraction of the length of the supply pipe. Since at least of portion of the return path may be warmer than the opposite portion of the supply pipe and/or the opposite portion of the forward path, the isolation advantageously ensures that the supply pipe and/or the forward path is unnecessarily heated by the warmer portion of the return path.

According to an embodiment the forward path and the supply pipe are arranged next to each other. Advantageously, arranging these pipes next to each other may provide a simple solution for manufacturing the fluid connection.

According to an embodiment the hydrogen refueling system may further comprise a heat conducting means arranged along the supply pipe to provide a thermal connection between the forward path and the supply pipe. Advantageously, the heat conducting means, e.g. a conducting structure or material, may improve heat conduction between the forward path and the supply pipe.

According to an embodiment the controller is configured to control the temperature of the supply pipe dependent on a temperature parameter relating to the temperature of the supply pipe or the hydrogen in the supply pipe. For example, such temperature parameter may be a pressure of the supply pipe cooling media in the forward path or the return path, a temperature measured at a location of the supply pipe.

According to an embodiment the controller facilitates cooling of the supply line when the temperature of the hydrogen supply line is above a threshold value. Advantageous in that hydrogen through the cooling system will lower the temperature of the hydrogen in the supply line and thereby the hydrogen supply line itself.

According to an embodiment cooling of the supply line facilitated by the forward path and/or return path is initiated by the controller when the temperature of the supply line is higher than the threshold value, wherein the threshold value is selected in the range of minus 10° C. to minus 50° C., preferably in the range of minus 15° C. to minus 45° C. and most preferably in the range of minus 16° C. to minus 40° C.

This is advantageous in that in this way the controller facilitates temperature control of temperature of supply line between the refuelings and thereby a preferred temperature of the supply line is maintained to the next refueling. The cooling of the supply line may easily be made several times between two subsequent refuelings however this depends naturally on the time here between.

According to an embodiment the controller facilitates cooling of the supply line at determined time intervals. The determined time interval could be a fixed value which ensures that the temperature of the hydrogen supply line does not exceed a given threshold value. Hence a time threshold could be said to be established which when exceeded initiates a flushing, which ensures a desired temperature of the hydrogen supply line.

The facilitation of cooling by the cooling system is made according to the present invention by circulation of hydrogen or cooling media (also referred to as cooling fluid) as described in this document.

According to an embodiment the time intervals are dynamically calculated based on input related to at least one of the list comprising: ambient temperature, length of hydrogen supply line, material of the hydrogen supply line and hydrogen temperature. Preferably the time intervals are calculated by the controller, however could also be made by other data processors. Ambient temperature could be of the hydrogen refueling system or of the supply line. The hydrogen temperature is often the same as the hydrogen supply line temperature at least after a "settlement time" has elapsed enabling heat/cold exchange between supply line and the cooling fluid used. Preferably it is the last known hydrogen temperature which is used e.g. known from the last refueling.

The heat/cold exchange also sometimes referred to as net heat transfer between the supply line and the cooling fluid used in the cooling circuit when settlement time has passed is zero. Following this fact, then if circulation of the cooling fluid is continued when the temperature of the supply line is the same as the temperature of the hydrogen in the supply line there will be no net heat exchange there between.

As mentioned, the time intervals could vary in time depending on different factors (see above and in addition could be mentioned isolation of the supply line). Accordingly a time interval could be e.g. be between 5 minutes and one or more days.

According to an embodiment the time intervals begins at one for the following: end of previous refueling, temperature determination or last flushing. Temperature determination is preferably a measurement from a temperature sensor but could also be established from knowledge of a temperature and time elapsed since that temperature was verified (and may be also some of the above information)

According to an embodiment the forward path is thermally isolated from supply line at least a fraction of the length of the supply line and wherein the return path is thermally coupled to the supply line at least a fraction of the length of the supply line.

According to an embodiment the cooling system includes a refrigerant in its solid state. This is advantageous in that then the coldest cooling fluid is thermally coupled to the part of the supply line where the coldest hydrogen is desired namely at the outmost part of the dispenser towards the hose. By outmost part is indicated that it is desired to design the cooling circuit so that the circulation of the cooling fluid (which preferably could be carbon dioxide) exchange as much cold as possible with the supply line as close to the point of delivery of hydrogen as possible i.e. as close to the hose/nozzle of the dispenser.

A second aspect of the invention relates to a method for cooling a supply pipe in a hydrogen refueling system, where the hydrogen refueling system is arranged for filling a vessel of a vehicle with hydrogen, the hydrogen refueling system comprising a hydrogen supply, a hydrogen center enclosure comprising a cooling system arranged for cooling the hydrogen delivered to the vessel, a dispenser arranged for supplying the hydrogen to the vessel, and a supply pipe arranged for guiding the hydrogen from the center enclosure to the dispenser, where the method comprises guiding a supply pipe cooling media from the cooling system hydrogen center enclosure towards the dispenser through a forward path so that the forward path cools the supply pipe, and guiding at least a fraction of the supply pipe cooling media back to the cooling system hydrogen center enclosure through a return path, where at least one of the forward and return paths are thermally connected with the cooling system, and where at least one of the forward and return path cools the supply pipe. A third aspect of the invention relates to use of carbon dioxide as a supply pipe cooling media in a forward path and a return path for cooling a supply line between a hydrogen center enclosure and dispenser in hydrogen refueling system.

FIGURES

In the following, exemplary embodiments of the invention are described with reference to the figures, of which

DETAILED DESCRIPTION OF EMBODIMENTS

Figure 1:
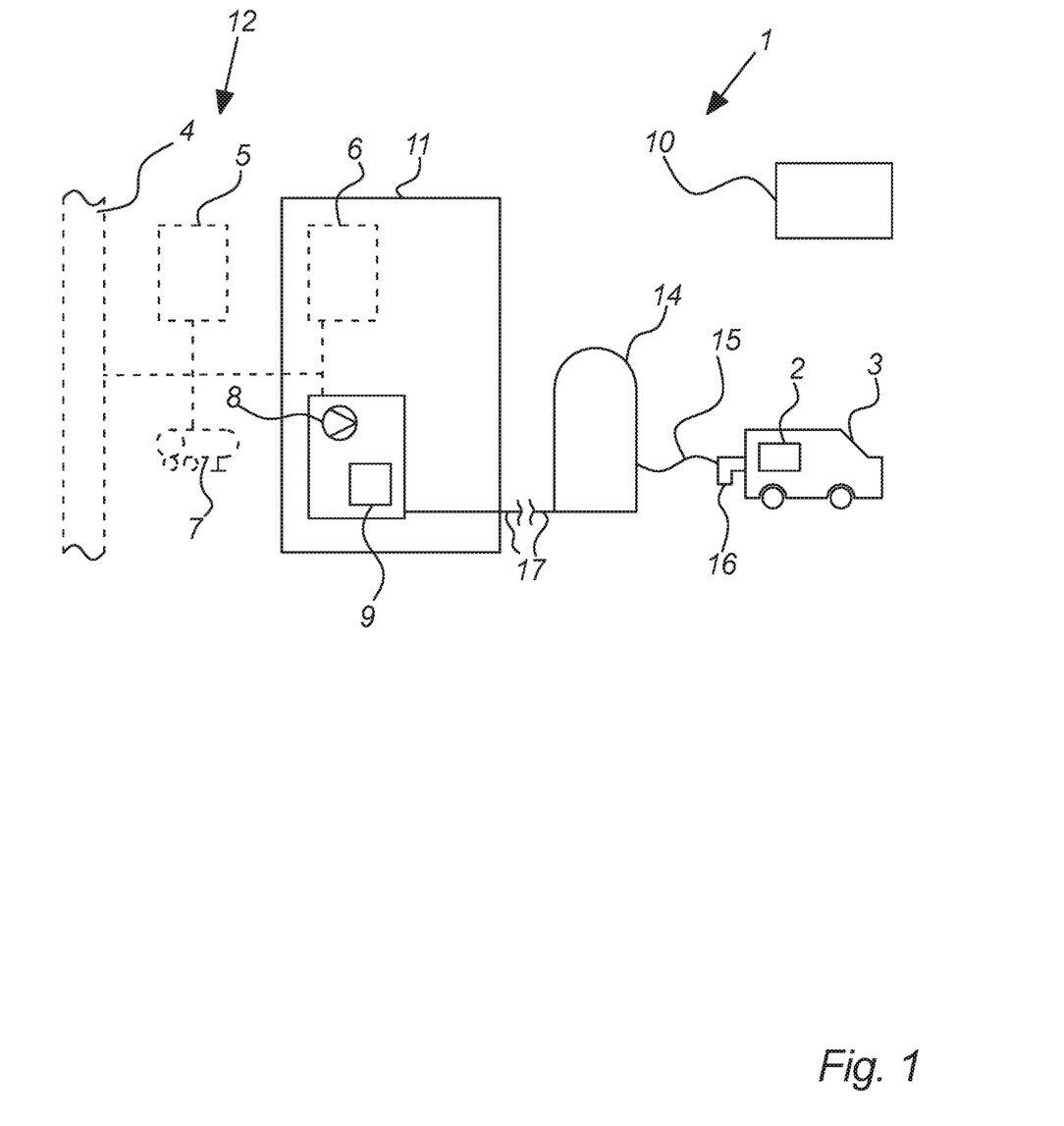
FIG. 1 shows a schematic view of a hydrogen refueling system.

FIG. 1 illustrates a schematic view of a hydrogen refueling system 1 according to an embodiment of invention. The hydrogen refueling system 1 supplies hydrogen to a receiving vessel 2 of a vehicle 3 from a hydrogen supply 12 in the form of a supply network 4, external hydrogen storage 5, internal hydrogen storage 6 or a temporary hydrogen storage 7.

To regulate the hydrogen pressure, temperature, flow, time etc. to comply with currents standards such as e.g. the SAEJ 2601 standard for refuelling of a vehicle 3 with hydrogen, the hydrogen refueling system 1 comprises a compressor 8, a cooling system 9 and a control and monitoring system 10 all which are preferably located within the hydrogen center enclosure 11 of the hydrogen refueling system 1.

The cooling system 9 may be embodied by a heat exchanger. Further, since it is preferred that the cooling system 9 is located or partly located in the center enclosure 11, it should be understood that e.g. for practical reasons the cooling system may also be located outside the center enclosure 11.

At most locations of hydrogen refueling system 1 it is preferred to physically separate the hydrogen refueling system enclosure 11 from a dispenser 14 which is connectable to the vehicle 3 by means of a hose 15 and a nozzle 16 (hydrogen outlet) for the purpose of filling the vessel 2. The hydrogen refueling system enclosure 11 and the dispenser 14 is connected by a fluid connection comprising one or more supply pipes 17 for supplying or guiding hydrogen from the hydrogen refueling system 1 to the dispenser 14. The hose 15 is arranged to receive the hydrogen from one of the supply pipes. The fluid connection may further comprise forward and return paths 20, 21 (see FIGS. 2 and 3) for guiding a supply pipe cooling media for cooling the one or more of the supply pipes 17 (also referred to as supply lines).

For example, the dispenser 14 and the hydrogen refueling system enclosure 11 may be separated by a distance of between 5 and 65 meters. This is mainly to obtain a design of the hydrogen refueling system 1 comparable to the known fossil fuel refueling stations and to increase safety in that the main part of the handling and storage of hydrogen is located at the hydrogen center enclosure 11.

One or more dispensers 14 may be connected to the hydrogen refueling system center enclosure 11.

A pipe such as the supply pipe may be any pipe, hose, tube, conduit or other fluidic passageway suited for guiding a fluid. The fluid may be a pressurized fluid in liquid or gas form. For example, the supply pipe may be a pipe extending between the enclosure 11 and the dispenser 14 and arranged for guiding pressurized hydrogen in gas form.

Even though the hydrogen refueling system 1 illustrated in FIG. 1 is illustrated to comprise the enclosure 11 and the dispenser 14 separated and connected via the fluid connection 17 it should be mentioned that the components of the hydrogen refueling system 1 from hydrogen supply 12 to the hydrogen outlet which in FIG. 1 is illustrated as a nozzle 16 and everything in between may be integrated completely in one enclosure or as illustrated in FIG. 1 installed as one or more individual components.

The hydrogen refueling system 1 further comprises a controller 10 arranged for monitoring one or more operational values of the hydrogen refueling system and for controlling functions of the hydrogen refueling system 1 dependent on the monitored one or more operational values.

The controller 10 is schematically illustrated, but it is understood that the controller 10 may be arranged with connections to the hydrogen refueling system 1 to monitor one or more operational values and to control one or more controllable functions of the system 1, such as actuators, controllable valves, pumps, etc.

The operational value may be one of a measured temperature, a measured pressure, a time, or a measured flow value or a temperature parameter, e.g. a temperature parameter relating to the temperature of the supply pipe 17 or the hydrogen in the supply pipe 17.

For example, the controller 10 may be configured to determine when cooling of the supply pipe 17 should be initiated by means of the supply pipe cooling media in the forward path 20. For example, the controller 10 may be configured to determine initiation of the cooling based on the monitored operational value, e.g. by comparing the threshold value with the operational value, e.g. in order to determine if threshold value is exceeded by the operational value.

In hydrogen refueling systems 1 comprising a plurality of dispensers 14 connected with a hydrogen center enclosure 11, the data communication setup between a plurality of controllers 10 and components such as valves and sensors may be similar to situations with only one dispenser module 14, i.e. a communication bus or other wired or wireless communication to and from the controllers.

Hydrogen flows from the hydrogen supply 12 to the supply pipe 17 via the cooling system 9. Therefore, the hydrogen is cooled down to the temperature determined by the cooling system 9. Accordingly, when the temperature of the cooled hydrogen is lower than the temperature of the supply pipe 17, the temperature of the supply pipe 17 will decrease and the temperature of the hydrogen in the supply pipe 17 will increase, e.g. until the temperatures are substantially the same.

Accordingly, in an initial phase of a refueling process the temperature of hydrogen may increase along the supply pipe 17 and, therefore, the target temperature of the hydrogen may not be within a desired range of e.g. minus 33° C. and minus 40° C. after a period of e.g. 30 seconds from start of the refueling. This is example is made with reference to a so-called T40 refueling other temperature ranges are desired if the refueling are made according to so-called T20 or T30 refuelings. Particularly, this may be the case if there has been no flow of hydrogen through the supply pipe for some time prior to initiating a refueling process. Embodiments of this invention provide solutions for cooling or pre-cooling the supply pipe 17 in between refueling processes, possibly also during refueling processes, by means of a cooling line 27 comprising forward and return paths 20, 21 for guiding a supply pipe cooling media along the supply pipe 17.

The desired temperature range of the hydrogen to be used for refueling may be set by standards, such as the range between minus 33° C. and minus 40° C. However, other desired temperature ranges may also be applied, e.g. a range from minus 30° C. to minus 43° C. Similarly other time periods associated with the desired temperature range than the mentioned period of 30 seconds may apply, e.g. a period less than 30 seconds or greater than 30 seconds. Furthermore, considering the possibility of cooling the hydrogen down to a temperature below the minimum threshold of e.g. minus 40° C., e.g. cooling the hydrogen down to minus 45° C., it may be sufficient to cool the supply pipe 17 down to a temperature of e.g. minus 25° C.

Accordingly, the controller 10 may be configured to control cooling of the supply pipe 17, i.e. to control a temperature of the supply pipe 17, according to different methods as described in connection with FIGS. 2-5, to achieve a desired temperature of the supply pipe, e.g. a desired temperature within a range from minus 20° C. to minus 43° C. The desired temperature may be obtained at location of the supply pipe 17 where the temperature is measured, e.g. by a temperature sensor 13 (see FIG. 2).

Functions of the controller 10 and other functions or elements described in relation to the hydrogen refueling system 1 in FIG. 1 apply similarly to other embodiments, e.g. embodiments described in connection with FIGS. 2 and 3, unless otherwise noted.

Figure 2:
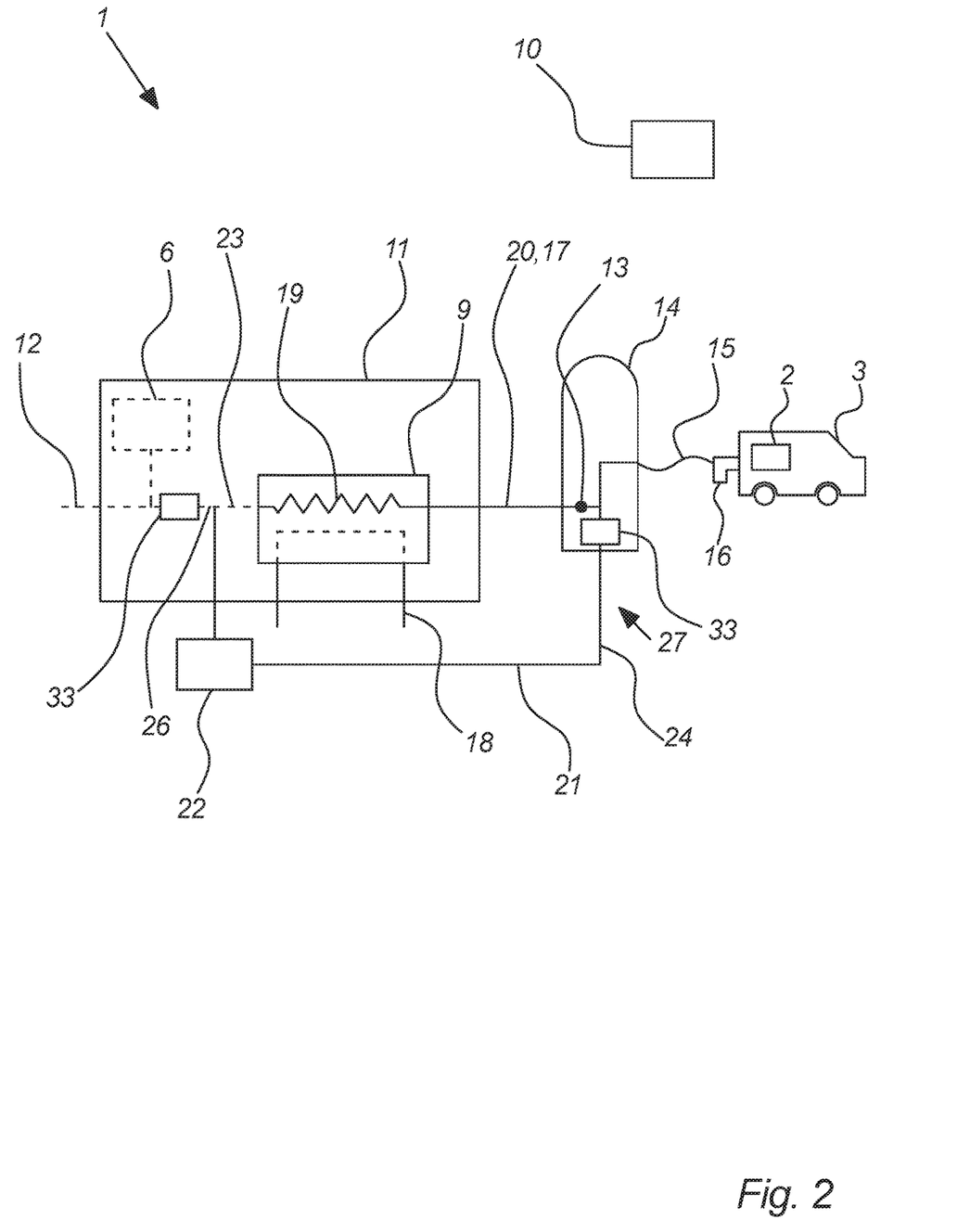
FIG. 2 shows a hydrogen refueling system according to another embodiment of the invention.

FIG. 2 shows the hydrogen refueling system 1 according to another embodiment of the invention. FIG. 2 corresponds to FIG. 1, but details of the hydrogen supply 12 and the compressor 8 as shown in FIG. 1 are not shown in FIG. 2 for convenience.

FIG. 2 shows that the cooling system 9 comprises an input cooling circuit 18 and an output cooling circuit 19. The input cooling circuit 18, which is principally illustrated, guides a cooling fluid for the cooling system 9. According to an embodiment, the cooling fluid is liquid carbon dioxide. Other cooling fluids like oil, refrigerants like liquefied propane, haloalkanes, anhydrous ammonia and sulfur dioxide may be used as cooling fluid. The refrigerants (sometimes in this document referred to as cooling fluid) that are most advantageous in the present invention is those that can change state/form between gas, solid and liquid. The output cooling circuit 19 is fluidly connected with the hydrogen supply 12. As hydrogen is guided through output cooling circuit 19, a thermal exchange takes place between the input cooling circuit 18 and the output cooling circuit 19, e.g. so that the output cooling circuit 19 and, thereby, the guided hydrogen, is cooled by the input cooling circuit.

Figure 4:
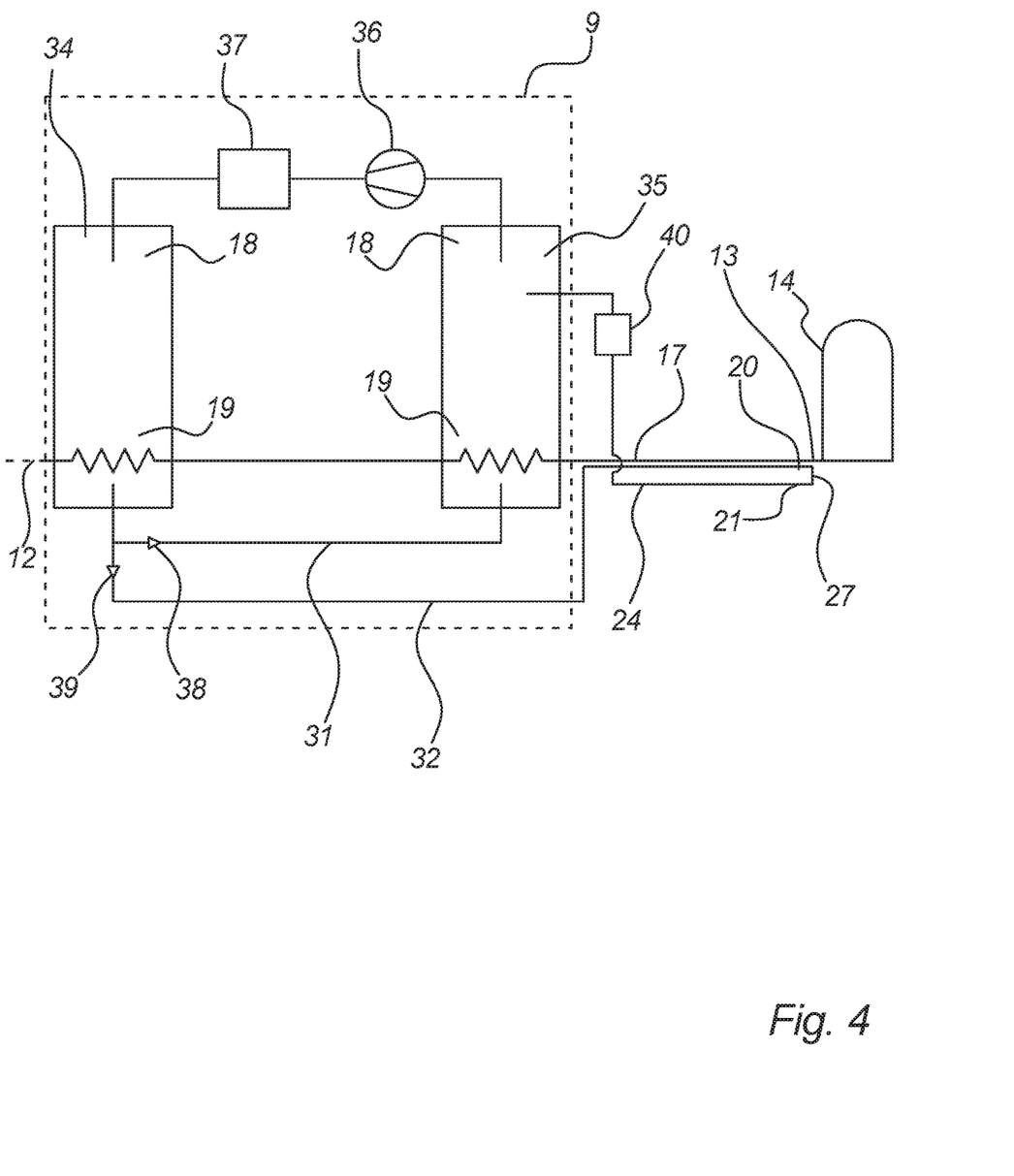
FIG. 4 shows an example of the cooling system.
Figure 5:
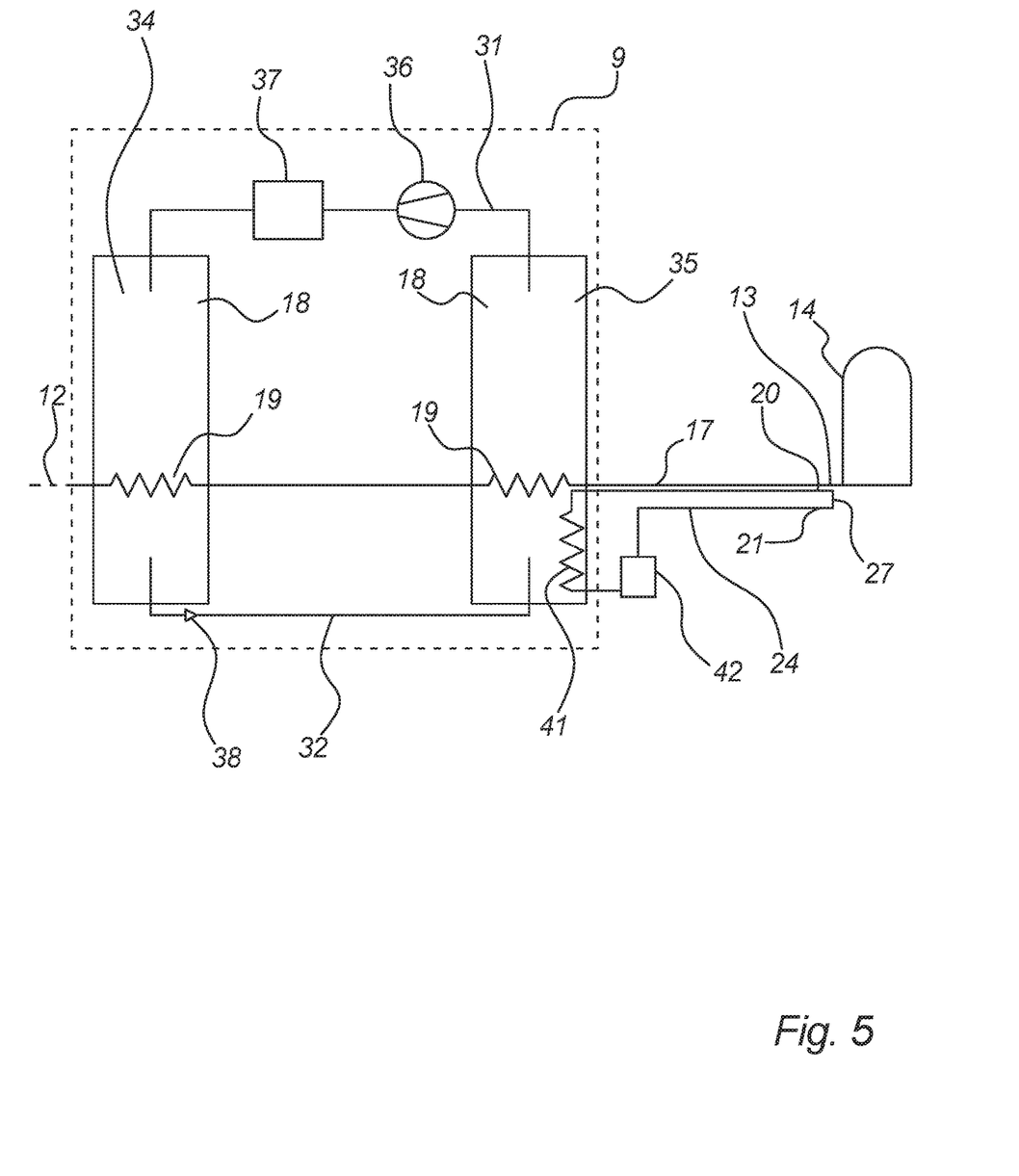
FIG. 5 shows another example of the cooling system.

The cooling system 9 may be configured in different ways, e.g. according to examples described in FIGS. 4-5. Accordingly, the input cooling circuit 18 is illustrated with a dashed line to indicate different principles for guiding the cooling fluid. Similarly, the output cooling circuit 19 is principally illustrated and could be configured in different ways, e.g. as illustrated in FIGS. 4-5.

The output cooling circuit 19 is fluidly connected with a supply pipe 17 so that the cooled hydrogen can be guided to the dispenser 14.

The supply pipe 17 is connected with a T-connection in order to guide the hydrogen to the hose 15 or to a return path 21. A Shut-off valve 33 is arranged in a return path 21, e.g. as illustrated within the enclosure of the dispenser 14.

The shut-off valve 33 is controllable via a control input, e.g. from the controller 10, to guide the hydrogen from the supply pipe 17 to the hose 15 or to the return path 21.

The return path 21 may be any pipe, hose, tube or other fluidic passageway suited for guiding a fluid.

The return path 21 is fluidly connected with the supply pipe 17 so that the return path 21 and the supply pipe 17 form at least part of a closed circuit 24 for circulating the hydrogen.

The closed circuit 24 may comprise the forward path 20, the return path 21, the connection between the pump 22, the inlet portion 23 and the output cooling circuit 19 and the shut-off valve 33 between the forward and return paths.

As shown, the return path 21 may connected with output cooling circuit 19, e.g. at an inlet portion 23 of the output cooling circuit 19, via a T-connection so that the hydrogen in the closed circuit 24 is repeatedly cooled by the cooling system 9. A further controllable shut-off valve 33 may be arranged between the T-connection at the inlet portion 23 and hydrogen supply 12. When this shut-off valve 33 is closed, the circulated hydrogen in the return path 21 is prohibited from flowing to the hydrogen supply, but instead flows via the forward path 20 and shot-off valve 33 in the dispenser back to the return path 21. Thus, when this shut-off valve is closed, the closed circuit 24 is fluidly disconnected from the hydrogen supply 12.

Thus, the shut-off valves 33 are controllable either to guide the hydrogen to the hose 15 or to the return path 21.

Accordingly, at least one of the forward and return paths 20, 21 are thermally connected with the cooling system 9. For example, the forward path 20 is thermally connected with the cooling system 9 in the sense that the forward path 20 receives the cooled hydrogen from the cooling system 9. Alternatively or additionally, the return path 21 may be thermally connected with the cooling system 9 in the sense that the return path 21 supplies the hydrogen into the cooling system 9 for cooling the supplied hydrogen.

When the shut-off valves 33 are controlled to guide the hydrogen from the supply pipe 17 to the return path 21, at least a part of the supply pipe 17 has the function of a forward path 20 in the closed circuit 24 for circulating the hydrogen. Accordingly, in an embodiment the forward path 20 consists of at least a fraction of the supply pipe 17.

The T-connection at the dispenser side may be located at any location along the supply pipe 17, e.g. at a location before the supply pipe 17 enters the dispenser 14, or in a preferred solution within the enclosure of the dispenser 14. Therefore, the forward path 20 may consist of at least a fraction of the supply pipe 17. Thus, the forward path 20 may comprise at least a fraction of the supply pipe 17, the output cooling circuit 19 and a pipe-portion extending between the inlet portion 23 and the return path 21.

Accordingly, in an embodiment the return path 21 is connected with the forward path 20, e.g. via the cooling system 9, so that the return and forward paths 20, 21 form part of a closed circuit 24 for circulating the hydrogen.

The forward path 20 extends at least a fraction of the distance between the hydrogen center and the dispenser system, e.g. the distance from the hydrogen center to the T-valve.

The hydrogen refueling system 1 further comprises a pump 22 for circulating the hydrogen in the closed circuit 24. The pump 22 is located in the path of the closed circuit 24, e.g. in the return path 21.

The pump 22 may be controllable dependent on the operational value. For example, the controller 10 may be configured to control the pump 22 dependent on the one or more operational values. Similarly, the controller 10 may be configured to control the check valves 33 dependent on the one or more operational values, e.g. the same operational values used for controlling the pump 22.

For example, the dispenser 14 may comprise a temperature sensor 13 for the purpose of monitoring the operational value in the form of a temperature. The temperature sensor 13 may be located at the supply pipe 17, e.g. before the T-connection, in order to measure the temperature of the supply pipe 17 or the hydrogen in the supply pipe.

The controller 10 may be configured to control a temperature of the supply pipe 17 dependent on a temperature parameter, e.g. a temperature parameter relating to the temperature of the supply pipe 17 or the hydrogen in the supply pipe 17. According to an embodiment, the temperature parameter may be the temperature measured by the temperature sensor 13. The cooling control of the supply pipe 17 may additionally be performed dependent on desired temperature threshold values, e.g. an upper temperature threshold value of e.g. minus 33° C. and a lower temperature threshold value of minus 40° C., alternatively dependent on a desired temperature set-point. For example, when the temperature increases towards minus 33° C., the pump 22 may be controlled by the controller 10 to increase the flow, and when the temperature decreases towards minus 40° C. the pump 22 may be controlled to decrease the flow so that the temperature remains within the desired interval between minus 33° C. and minus 40° C.

As mentioned previously, the desired temperature threshold values, equivalent to the desired temperature range may be different from the range minus 33° C. to minus 40° C. Furthermore, as mentioned a desired temperature of the supply pipe 17 may lie outside the desired temperature range. For example, the controller 10 may be configured to obtain desired temperature of e.g. minus 25° C. by using a desired temperature set-point minus 25° C.

According to an embodiment of the invention, a temperature range between an upper and lower threshold defines the temperature range within which the temperature of the hydrogen is desired to be when used for refueling a vehicle.

A ranges from e.g. minus 10° C. to minus 50° C. is advantages especially the part above minus 40° C. in that if the supply line is cooled to a lower temperature than minus 40° C. the hydrogen supply line functions as a cooling buffer even for a so-called T40 refueling.

The upper and lower threshold values are preferably defined according to the target temperature of the refueling. Hence if the refueling is a so-called T20 refueling the temperature of the hydrogen supplied to the vehicle should be between minus 16° C. and minus 26° C. In the same way if the refueling is a so-called T30 refueling the hydrogen temperature should be between minus 33° C. and minus 40° C. Accordingly, the values of the thresholds should reject these temperatures.

According to the embodiment described in connection with FIG. 2 the hydrogen is used as a supply pipe cooling media for cooling the one or more supply pipes 17 and the cooling system 9 is therefore arranged to cool the supply pipe cooling media, i.e. the hydrogen, circulating in the output cooling circuit 19 by means of the cooling fluid, e.g. carbon dioxide, circulating in the input cooling circuit 18. The cooling system 9 is therefore arranged to guide the supply pipe cooling media, here in the form of hydrogen, to the forward path 20.

The forward and return paths 20, 21 constitute a cooling line 27 for cooling the supply pipe, i.e. a cooling line where the forward path 20 facilitates cooling of the supply pipe 17.

Figure 3:
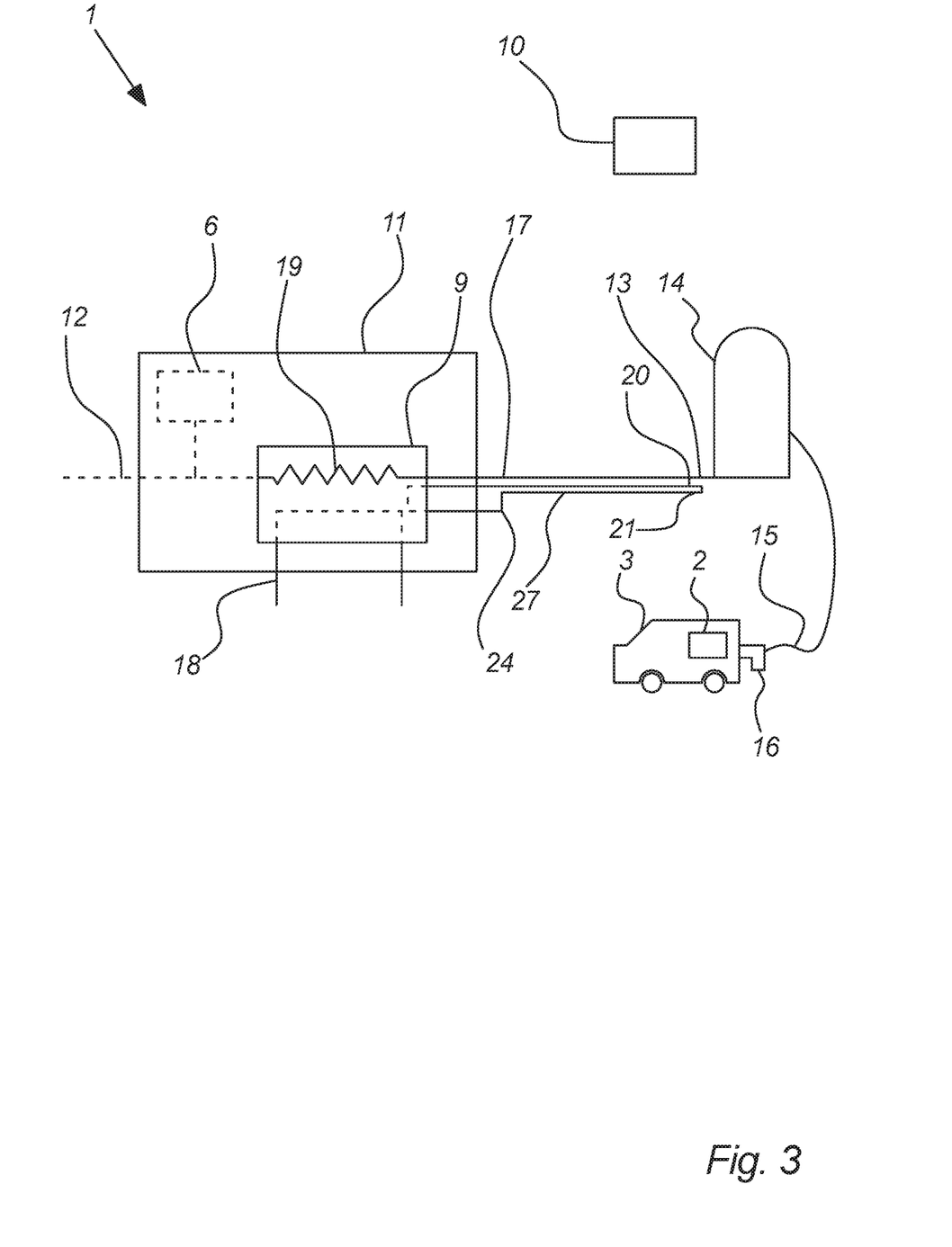
FIG. 3 shows the hydrogen refueling system according to another embodiment of the invention.

FIG. 3 shows the hydrogen refueling system 1 according to another embodiment of the invention. FIG. 3 corresponds to FIG. 1, but details of the hydrogen supply 12 and the compressor 8 as shown in FIG. 1 are not shown in FIG. 2 for convenience.

Elements in FIGS. 2 and 3 having the same reference number have the same or corresponding function. Accordingly, functions and elements already described in connection with FIG. 2 are not explained in connection with FIG. 3.

The output cooling circuit 19 is fluidly connected with a supply pipe 17 so that the cooled hydrogen can be guided to the dispenser 14. However, in this embodiment, the return path 21 is not connected with the supply pipe 17.

According to this embodiment, the forward and return paths 20, 21 of the cooling line 27 (i.e. second cooling circuit) are embodied by pipes or similar fluidic passageways.

The cooling system 9 is arranged to be cooled by a cooling fluid circulated in the cooling system 9, e.g. in the input cooling circuit 18 (i.e. first cooling circuit). The cooling fluid may be carbon dioxide.

The forward and return paths 20, 21 are engaged with the cooling system 9, so that the supply pipe cooling media in the forward and return paths 20, 21 can be cooled by the cooling fluid circulated in the input cooling circuit 18. Accordingly, the forward and return paths 20, 21 are arranged to be cooled by the cooling fluid circulated in the input cooling circuit 18. The supply pipe cooling media may be cooled in different ways by the cooling fluid and, therefore, the engagement of the forward and return paths 20, 21 with the cooling system 9 is shown principally with dashed lines.

For example, the forward and return paths 20, 21 may be fluidly connected with the input cooling circuit 18 so that the cooling fluid in the input cooling system can be circulated in the forward and return paths 20, 21. Accordingly, the supply pipe cooling media in the cooling line 27 may be the same fluid as the cooling fluid in the input cooling system.

In another example, the supply pipe cooling media in the cooling line 27 is fluidly disconnected from the cooling fluid in the input cooling system 18. For example, the forward and return paths 20, 21 may form a closed circuit 24 which is not fluidly connected with the input cooling circuit 18, but which is cooled by the cooling fluid (by thermal heat exchange) so that the circulated supply pipe cooling media is cooled by the cooling fluid.

Compared with the embodiment of FIG. 2, the forward and return paths 20, 21 are fluidly disconnected from the supply pipe 17.

The forward and/or return paths 20, 21 extend along the supply pipe 17 at least a fraction of the distance between the hydrogen center and the dispenser system. Thus, the forward and/or return paths 20, 21 may extend along the supply pipe 17 to the dispenser 14 or partly to the dispenser 14.

The hydrogen refueling system 1 may further comprise a pump 42 (see FIG. 5) for circulating the supply pipe cooling media in the closed circuit 24. The pump 22 may be located in the path of the closed circuit 24, e.g. in the return path 21.

FIG. 4 shows an example of the cooling system 9. The cooling system 9 comprises a first tank 34 and a second tank 35 which both contains a cooling fluid in the form of carbon dioxide. The first tank 34 contains carbon dioxide under higher pressure than the carbon dioxide in the second tank 35. The hydrogen from the hydrogen supply 12 is guided through the bottom of one or both of the tanks 34, 35 for cooling the hydrogen before guiding the hydrogen to the dispenser 14. The lower part of the tanks 34, 35 contain carbon dioxide in liquid and/or solid form having a temperature low enough to cool the hydrogen down to e.g. a temperature of minus 40° C. The input circuits 19 are located within the lower part of the tanks 34, 35 so that the input circuits 19 are located within a portion of the contain carbon dioxide being in liquid and/or solid form.

The top of the tanks 34, 35 contain carbon dioxide in gas form. A compressor 36 is arranged to suck carbon dioxide in gas—from from the second tank 35 to the first tank 34 via a condensing heat exchanger 37. The condensing heat exchanger 37 cools the carbon dioxide gas and condenses it to liquid form. The condensed carbon dioxide is guided into the first tank 34.

A first cooling fluid pipe 31 is arranged to guide liquid carbon dioxide from the first tank 34 to the second tank 35 via a first controllable injection valve 38. The injection valve causes a pressure drop resulting in a temperature decrease of the carbon dioxide.

A second cooling fluid pipe 32 is arranged to guide liquid carbon dioxide from the first tank 34 to the forward path 20 via a second controllable injection valve 39. The carbon dioxide is guided through the forward and return paths 20, 21 and is returned to the second tank in the form of gas via a back-pressure valve 40. The back pressure valve 40 ensures that the pressure in the forward and backward paths 20, 21 does not drop to the pressure in the second tank 35. As with other embodiments, it may be advantageous to thermally couple the return path 21 to the supply line 17 and at the same time isolate the forward path therefrom.

The second injection valve 39 is controllable to open more or less dependent on temperature parameter relating to the temperature of the supply pipe 17 or the hydrogen in the supply pipe 17. The temperature relating parameter may be a pressure in the forward and return path 20, 21. The pressure may be obtained by a pressure measurement in a pipe connection between the back-pressure valve 40 and the return path 21 (e.g. by a pressure sensor located upstream the back pressure valve 40 in FIG. 4). In principle, the pressure could be measured at any located of the pipe extending between the injection valve 39 and the back-pressure valve 40. This pressure is directly related to the temperature of the forward path and therefore related to the temperature of the supply pipe 17. Therefore the pressure can be used as temperature parameter relating to the temperature of the supply pipe 17.

According to the example in FIG. 4, the controller 10 may be configured to control the superheat (heating above boiling point) of the cooling fluid. This control may be performed by controlling the injection valve 39.

For example, the controller 10 may be configured to control the injection valve 39 based on a pressure of carbon dioxide measured upstream the back-pressure valve 40 and a temperature of carbon dioxide measured upstream the back-pressure valve 40. The temperature of carbon dioxide may be measured by a temperature sensor located upstream the back-pressure valve 40, i.e. upstream relative to the back-pressure valve 40. This controlling may be performed so that the evaporation temperature (boiling point) corresponding to the measured pressure, is smaller than the temperature measured by the temperature sensor by a given temperature difference, e.g. 6° C. The temperature difference is in general dependent on the cooling fluid, i.e. the refrigerant used in the cooling system 9. The purpose of maintaining a given temperature difference, is to maintain a desired ratio between carbon-dioxide—or other cooling fluid—on liquid form and gas form in order to ensure that the cooling fluid returned through the back-pressure valve to the tank 35 is in the form of gas. Accordingly, the cooling fluid in forward and return paths may comprise cooling fluid in gas form and cooling fluid in liquid form. By having an amount of the cooling fluid in gas form, evaporation of the cooling fluid is maintained so that the change of temperature along the forward path 20 is relatively small.

As an alternative, the controller 10 may be configured to control the injection valve 39 based on a temperature of the supply pipe, e.g. a temperature measured by the temperature sensor 13 as shown in FIG. 4.

Similarly to previous examples, the cooling control of the supply pipe 17 may additionally be performed dependent on temperature threshold values so that the temperature of the supply pipe 17 remains within the desired interval between minus 33° C. and minus 40° C.

Furthermore, similarly to previous examples, the desired temperature threshold values, equivalent to the desired temperature range may be different from the range minus 33° C. to minus 40° C. Furthermore, as mentioned a desired temperature of the supply pipe 17 may lie outside the desired temperature range. For example, the controller 10 may be configured to obtain a desired temperature at a location of the supply pipe in range from e.g. minus 25° C. to e.g. minus 40° C.

The example described in FIG. 4 shows how the forward and return paths 20, 21 can be arranged to be cooled by the cooling fluid, here carbon dioxide, circulated in the input cooling circuit 18. Specifically, the example shows how the forward and return paths 20, 21 can be fluidly connected with cooling system 9 to enable at least a fraction of the flow of the cooling fluid circulated in the cooling system to be circulated in the forward and return paths 20, 21. The fraction of the flow of the cooling fluid is dependent on the control input to the injection valve 39 and or injection valve 38.

FIG. 5 shows another example of the cooling system 9, where the part of the cooling system 9 for cooling the hydrogen from the hydrogen supply 12 is the same as in FIG. 4.

In FIG. 5, the forward and return paths 20, 21 are arranged so that the supply pipe cooling media in the forward and return paths 20, 21 is circulated through a cooling fluid heat exchanger part 41 located in the one of the first and second tanks 34, 35 or possibly located in both tanks. The supply pipe cooling media is circulated through the forward and return paths 20, 21 by means of a pump 42, e.g. located in the return path 21. The supply pipe cooling media may be carbon dioxide or other fluid suited for use as supply pipe cooling media. In this example the supply pipe cooling media is cooled by thermal heat exchange with the cooling fluid circulated in the input cooling system 18.

The pump 42 may be controllable dependent on the operational value. For example, the controller 10 may be configured to control the pump 22 dependent on the one or more operational values, e.g. a temperature parameter such as the temperature measured by the temperature sensor 13 as explained in connection with FIG. 2.

According to the example in FIG. 5, the controller 10 may be configured to control a temperature of the supply pipe 17 dependent on the temperature parameter by controlling the pump 42. The cooling control of the supply pipe 17 may additionally be performed dependent on temperature threshold values so that the temperature of the supply pipe 17 remains within the desired interval between minus 33° C. and minus 40° C.

The example described in FIG. 5 shows how the forward and return paths 20, 21 can be arranged to be cooled by the cooling fluid circulated in the input cooling circuit 18 by heat exchange with the supply pipe cooling media through the cooling fluid heat exchanger part 41.

It is noted that the input cooling circuit 18 in FIGS. 4-5 comprise the carbon dioxide in the tanks 34, 35 in forms of gas and liquid and/or solid carbon dioxide. CO2 in the solid state is advantageous in that then a cooling bank can be built and thereby cover the exchanger part 41 in a CO2 ice block. Thereby facilitate cooling of the circulating cooling media even if the cooling system is out of operation e.g. because a cooling bank is built during nigh or other hours where energy is available at low price and the hourly rate of refuelling's is low.

Figure 6:
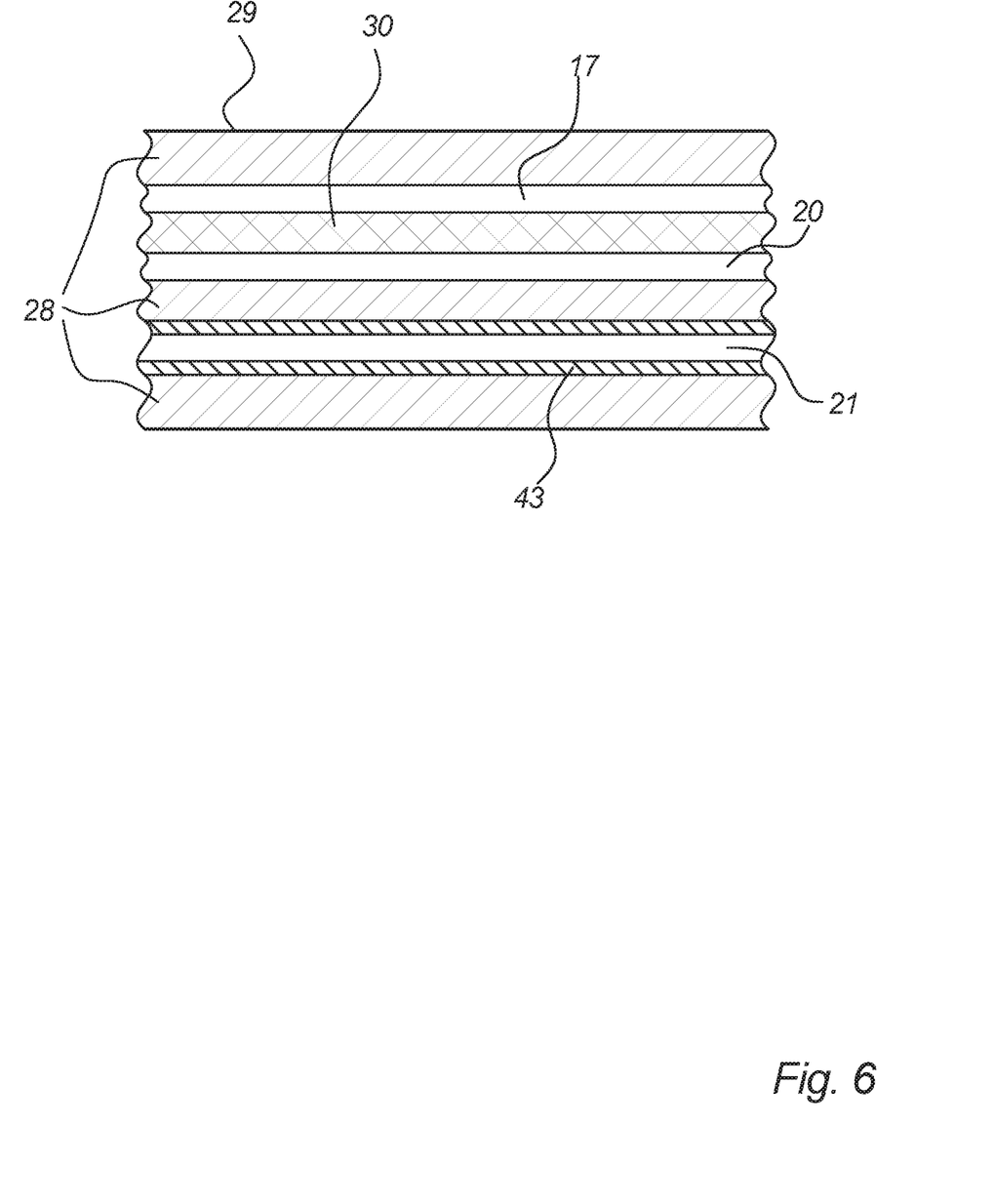
FIG. 6 shows an example of the fluid connection between the cooling system and the dispenser.

FIG. 6 shows an example of the fluid connection between the cooling system 9 and the dispenser 14 for the examples described in connection with FIGS. 3-5. FIG. 6 shows a cross-sectional view of the fluid connection along a longitudinal extension of the fluid connection. Thus, FIG. 6 shows the supply pipe 17, the forward path 20 and the return path 21. At FIG. 6, the fluid connection is arranged so that the forward line 20 is thermally connected with the supply pipe 17 over at least a fraction of the length of the supply pipe 17. However, it is preferred that it is the return path 21 which is thermally connected to the supply pipe 17. Therefore, as mentioned and now underlined when in this description forward path 20 is mentioned as thermally connected to the supply path, then it should be remembered, that this might as well be the return path 21. The thermal connection may be achieved in different ways. The supply pipe 17 and the forward path 20 may be made from pipes having good thermal conduction properties, e.g. steel pipes, stainless steel pipes, aluminum pipes or copper. Preferably, the supply pipe 17 is made from stainless steel, whereas the forward path 20 is preferably made from a material with very good thermal conduction properties, like aluminum or copper. The supply pipe 17 and the forward path 20 may be arranged to contact each other along a longitudinal extension, e.g. the supply pipe 17 and the forward path 20 may be arranged next to each, e.g. adjacent to each other, so that the pipes contact each other along a common contact line extending along the supply pipe. In order to improve the thermal conduction between the pipes, a thermal conducting paste may be arranged between the supply pipe 17 and the forward path 20, e.g. along facing surfaces of the pipes. Additionally or alternatively, a thermal conductive foil or adhesive tape may be wounded around the supply pipe 17 and the forward path 20, i.e. so that foil forms common windings around both the supply pipe 17 and the forward path 20. Additionally or alternatively, a thermally conductive rail or profile, e.g. made from aluminum, may be arranged between and along the supply pipe 17 and the forward path 20. The profile may have a shape which increases the contact area between the supply pipe 17 and the forward path 20. For example, the profile may have a first concave surface arranged to extend along the supply pipe and to contact the supply pipe over fraction of the circumference of the pipe. Similarly, the profile may have a second opposite concave surface arranged to extend along the forward path and to contact the forward path over a fraction of the circumference of the pipe of the forward path.

In an alternative configuration of the fluid connection, the forward path 20 is arranged to form a helix around the supply pipe 17 over at least a fraction of the length of the pipe. Thus, the forward path may be spiralled around the supply pipe in a forward direction, whereas the return path is returned isolated from the supply pipe. Possibly, the forward line spiralled around the supply pipe forth and back, one or more times, e.g. so that the back spiralling constitutes the return path. The forward path may be spiralled so that adjacent windings contact, or are separated by a distance, e.g. a distance corresponding to the diameter of the pipe of the forward path 20.

Accordingly, a heat conducting means 30, in the form of the described conductive paste, the conductive rail, the circumscribing foil, the helix-shaped forward path, including combinations thereof, may be arranged along the supply pipe 17 to improve heat conduction between the forward path 20 and the supply pipe 17.

The return path is 21 is thermally isolated from the supply pipe 17 and or the forward path 20 over at least a fraction of the length of the supply pipe. The thermal isolation may be achieved by arranging a thermal isolating material around the return path 21.

The supply pipe 17, the forward path 20 and the return path 21 may be contained within a circumscribing tube 29 which contains tube isolation material 43 which may constitute the isolation material for the return pipe 21. Additionally, the supply pipe 17, the forward path 20 and the return path 21 may be surrounded by the tube isolation material 28 provided in the circumscribing tube 29.

From the above description it is now clear that the present invention relates to a hydrogen refueling station having a center enclosure separate from a dispenser and fluidly connected with a supply line. The supply line facilitates a flow of hydrogen gas between the enclosure and the dispenser. During a refueling of a vehicle, the temperature of the supply line moves towards the temperature of the hydrogen flowing from the center module to the dispenser. This temperature i.e. the temperature of the hydrogen is preferably within a desired temperature range, e.g. a range between minus 33° C. and minus 40° C.

When the flow of hydrogen stops the temperature of the supply line starts to increase towards its ambient temperature. This temperature rise has to be compensated for to be able to comply with temperature requirements to hydrogen in a refueling. One way of ensuring compliance with these temperature requirements is to cool the hydrogen to a very low temperature which when flowing to the dispenser is not heated above the upper temperature threshold for the requirements of the hydrogen temperature by the supply line.

According to the present invention an alternative hereto is to control the temperature of the supply line between subsequent refueling. This may be done by circulating hydrogen in a closed circuit 24 including the cooling system 9, a pump 22 and the supply line 17. Alternatively the present invention suggest to provide a cooling circuit comprising the cooling system 9, the forward path 20 thermally connected to the supply line 17 and a return path for returning the supply pipe cooling media to the cooling system where it is cooled again.

In both of the methods described according to the present invention the control of the temperature of the supply line 17 may be facilitated by the controller 10 which based on input from various pressure and temperature sensors etc. facilitates control of various pumps, valves, etc.

From the above description of the present invention it is now clear that using a cooling circuit/system for circulation of a cooling fluid such as carbon dioxide along at least part of the supply line 17 between the hydrogen refueling system enclosure 11 and the dispenser module 14 of a hydrogen refueling system is a very efficient way of controlling the temperature of the supply line 17.

This is especially true in the in the situation where the forward line 20 and/or the return line 21 is thermally connected to the supply line 17 at least in the dispenser 14 but also at least part of the length of the supply line 17 outside the dispenser 14.

Further it is especially true if the cooling system facilitates delivering a carbon dioxide at a temperature lower than the temperature required for the hydrogen at a refueling. Such cooling system could be a triple point carbon dioxide based cooling system i.e. using carbon dioxide in its solid state.

It is desired to obtain the lowest hydrogen temperature at the dispenser 14, therefore it is advantageous to thermally connect the forward line 20 and the return line 21 at the dispenser 14 to the supply line 17 to facilitate maximum heat/cold exchange to the hydrogen supply line 17 at the dispenser 14.

In an embodiment, the hydrogen refueling system for filling a vessel of a vehicle with hydrogen, the hydrogen refueling system comprises: a hydrogen supply, a hydrogen center enclosure comprising a cooling system, where the cooling system is arranged for cooling the hydrogen delivered from the hydrogen supply to the vessel, a dispenser arranged for supplying the hydrogen to the vessel, a supply pipe arranged for guiding the hydrogen from the center enclosure to the dispenser, a forward path arranged for guiding a supply pipe cooling media supply pipe cooling media from the hydrogen center enclosure towards the dispenser where the forward path extends at least a fraction of the distance between the hydrogen center and the dispenser system, and a return path arranged for guiding at least a fraction of the supply pipe cooling media back to the hydrogen center enclosure, where at least one of the forward and return paths are thermally connected with the cooling system, a controller facilitating monitoring an operational value of the hydrogen refueling system, characterized in that the forward path and/or return path facilitates cooling of the supply pipe.

From the above it is now clear, that the present invention describes a system in which the net heat transfer between the cooling fluid/fluid connection 17 and the hydrogen is reduced, preferably eliminated. Hence, the temperature of the hydrogens is substantially the same at both ends of the fluid connection 17. This is advantageous in that the peak capacity of the cooling system can be reduced to the temperature required at the dispenser 14 in that the hydrogen should not also give off heat to the fluid connection 17.

The downside of reducing the capacity of the cooling system is that cooling of the fluid connection 17 preferably continuous cooling so that a refueling can be made at any time is needed. As described above, this requires a cooling circuit 24 and a cooling system 9 controlled so that the desired temperature of the fluid connection 17 is remained.

LIST OF REFERENCE NUMBERS

1. Hydrogen refueling system
2. Receiving vessel
3. Vehicle
4. Hydrogen supply network
5. External hydrogen storage
6. Internal hydrogen storage
7. Temporary hydrogen storage
8. Compressor
9. Cooling system
10. Control and monitoring system
11. Hydrogen refueling system enclosure
12. Hydrogen supply
13. Temperature sensor
14. Dispenser
15. Hose
16. Nozzle
17. Fluid connection
18. Input cooling circuit
19. Output cooling circuit
20. Forward path
21. Return path
22. Pump
23. Inlet portion of the input cooling circuit
24. Closed circuit
26. Outlet portion of the hydrogen supply
27. Cooling line
28. Tube isolation
29. Circumscribing tube
30. Heat conducting means
31. First cooling fluid pipe
32. Second cooling fluid pipe
33. Shut off valve
34. First tank
35. Second tank
36. Compressor
37. Condensing compressor
38. First injection valve
39. Second injection valve
40. Back pressure valve
41. Cooling fluid heat exchanger part
42. Cooling fluid pump
43. Isolation

The invention claimed is:
1. A hydrogen refueling system for filling a vessel of a vehicle with hydrogen, the hydrogen refueling system comprising:
   a hydrogen center enclosure fluidly connected to a dispenser by a supply pipe, a first portion of the supply pipe disposed within the hydrogen center enclosure and a second portion of the supply pipe extending between the hydrogen center enclosure and the dispenser,
   a cooling system comprising a first cooling circuit arranged to cool the first portion for cooling the supply pipe and a second cooling circuit arranged for cooling the second portion of the supply pipe, and
   a controller,
   wherein the second cooling circuit is formed at least partly by a return path fluidly connected to a forward path thereby facilitating a circulation of a supply pipe cooling media-along a length of the second portion of the supply pipe, wherein at least part of the second cooling circuit is thermally connected to the second portion of the supply pipe, the controller initiates cooling of the supply line by the forward path or return path of the second cooling circuit when the temperature of the supply line is higher than a threshold value such that the supply pipe is cooled between refueling processes.

2. A hydrogen refueling system according to claim 1, wherein the supply pipe cooling media is a refrigerant wherein the refrigerant facilitates a change of state from its liquid state to its gaseous state as it passes through the cooling circuit, wherein the refrigerant is in its gaseous state at the end of the return path.

3. A hydrogen refueling system according to claim 2, wherein the forward path is thermally isolated from the supply pipe over at least a fraction of the length of the supply pipe and wherein the return path is thermally connected to the supply pipe over at least a fraction of the length of the supply pipe.

4. A hydrogen refueling system according to claim 1, wherein the controller is configured to control a temperature of the supply pipe dependent on an operational value.

5. A hydrogen refueling system according to claim 1, where an operational value is one of a measured temperature, a measured pressure, a time, a measured flow value or a temperature parameter.

6. A hydrogen refueling system according to claim 1, where the cooling system is additionally arranged to cool the supply pipe cooling media.

7. A hydrogen refueling system according to claim 1, comprising a pump for circulating supply pipe cooling media in a closed circuit.

8. A hydrogen refueling system according to claim 1, where the hydrogen refueling system is configured so that the forward and return paths are fluidly disconnected from the supply pipe.

9. A hydrogen refueling system according to claim 2, wherein the forward and return paths are arranged to be cooled by the cooling fluid circulated in the cooling system.

10. A hydrogen refueling system according to claim 2, where the forward and return paths are fluidly connected with cooling system to enable at least a fraction of the flow of the cooling fluid circulated in the cooling system to be circulated in the forward and return paths.

11. A hydrogen refueling system according to claim 1, further comprising a heat conducting material arranged along the supply pipe to provide a thermal connection between the forward path or return path and the supply pipe.

12. A hydrogen refueling system according to claim 1, wherein the controller is configured to control the temperature of the supply pipe dependent on a temperature parameter relating to the temperature of the supply pipe or the hydrogen in the supply pipe.

13. A hydrogen refueling system according to claim 1, wherein the controller facilitates cooling of the supply pipe when the temperature of the supply pipe is above a threshold value.

14. A hydrogen refueling system according to claim 2, wherein cooling of the supply pipe facilitated by the forward path or return path is initiated by the controller when the temperature of the supply pipe is higher than the threshold value, wherein the threshold value is selected in the range of minus 10° to minus 50° C.

15. A hydrogen refueling system according to claim 1, wherein the controller facilitates cooling of the supply pipe at determined time intervals, wherein the time intervals are dynamically calculated based on input related to at least one of the list comprising: ambient temperature, length of supply pipe, material of the supply pipe and hydrogen temperature.

16. A hydrogen refueling system according to claim 15, wherein the time intervals begin at one for the following: end of previous refueling, temperature determination or last flushing.

17. A hydrogen refueling system according to claim 1, wherein the cooling system includes a refrigerant in its solid state.

18. A hydrogen refueling system according to claim 1, wherein the cooling of the supply pipe in the hydrogen refueling system comprises the following steps guiding a supply pipe cooling media from the cooling system towards the dispenser through the forward path, and guiding at least a fraction of the supply pipe cooling media back to the cooling system through the return path, where at least one of the forward and return paths are thermally connected with the cooling system, and where at least one of the forward and return path cools the supply pipe.

19. The system of claim 1, wherein at least part of the forward path or return path of the cooling circuit is thermally connected to at least a fraction of the supply pipe extending between the hydrogen center enclosure and the dispenser.

20. A hydrogen refueling system for filling a vessel of a vehicle with hydrogen, the hydrogen refueling system comprising:

a hydrogen center enclosure fluidly connected to a dispenser by a supply pipe, a first portion of the supply pipe disposed within the hydrogen center enclosure and a second portion of the supply pipe extending between the hydrogen center enclosure and the dispenser, a cooling system comprising a first cooling circuit arranged to cool the first portion of the supply pipe and a second cooling circuit arranged for cooling the second portion of the supply pipe, wherein the second cooling circuit is formed at least partly by a return path fluidly connected to a forward path thereby facilitating a circulation of a supply pipe cooling media along a length of the second portion of the supply pipe, and a controller, wherein a least part of the second cooling circuit is thermally connected to the second portion of the supply pipe, wherein at least part of the forward path or return path of the cooling circuit is thermally connected to at least a fraction of the supply pipe extending between the hydrogen center enclosure and the dispenser, and wherein the controller is configured for controlling the temperature of the supply pipe such that, the temperature of the supply pipe is cooled by the second cooling circuit between the end of one refueling and the start of a subsequent refueling.

* * * * *